US012649197B2

(12) United States Patent
Pischel et al.

(10) Patent No.: US 12,649,197 B2
(45) Date of Patent: Jun. 9, 2026

(54) DETECTION OF CONTACT TIP CONSUMPTION WITH WELDING

(71) Applicant: Lincoln Global, Inc., Santa Fe Springs, CA (US)

(72) Inventors: Matthew R. Pischel, Medina, OH (US); Daniel P. Fleming, Painesville, OH (US)

(73) Assignee: LINCLN GLOBAL, INC., Santa Fe Springs, CA (US)

( * ) Notice: Subject to any disclaimer, the term of this patent is extended or adjusted under 35 U.S.C. 154(b) by 1053 days.

(21) Appl. No.: 17/731,338

(22) Filed: Apr. 28, 2022

(65) Prior Publication Data

US 2023/0278128 A1 Sep. 7, 2023

Related U.S. Application Data

(60) Provisional application No. 63/316,042, filed on Mar. 3, 2022.

(51) Int. Cl.
B23K 9/095 (2006.01)
B23K 9/133 (2006.01)
B23K 9/28 (2006.01)

(52) U.S. Cl.
CPC ............ B23K 9/0956 (2013.01); B23K 9/095 (2013.01); B23K 9/28 (2013.01); B23K 9/133 (2013.01)

(58) Field of Classification Search
CPC ........ B23K 9/095; B23K 9/0956; B23K 9/28; B23K 9/133; B23K 9/173
See application file for complete search history.

(56) References Cited

U.S. PATENT DOCUMENTS

| | | | |
|---|---|---|---|
| 4,947,024 A | 8/1990 | Anderson | |
| 5,556,562 A | 9/1996 | Sorenson | |
| 6,130,407 A * | 10/2000 | Villafuerte | B23K 9/0956 219/130.01 |
| 6,703,579 B1 | 3/2004 | Rice | |
| 7,381,923 B2 * | 6/2008 | Gordon | B23K 9/123 219/137.61 |
| 7,705,269 B2 | 4/2010 | Daniel | |

(Continued)

FOREIGN PATENT DOCUMENTS

| | | |
|---|---|---|
| EP | 1 323 339 B1 | 12/2004 |
| JP | H06-170542 A | 6/1994 |
| JP | 2004-025213 A | 1/2004 |

*Primary Examiner* — Brian W Jennison
(74) *Attorney, Agent, or Firm* — David J. Muzilla; Ivan P. Gracic

(57) ABSTRACT

An embodiment includes an apparatus for supporting automatic welding performed by a welding system. A welding contact tip is configured to be attached to a welding tool and is configured to accept a consumable welding wire electrode that is fed there-through during an automatic GMAW welding process to form an arc between a tip of the consumable welding wire electrode and a work piece. A secondary material, being of a different material from that of the welding contact tip, is positioned at or near a distal end of the welding contact tip. During the automatic GMAW welding process, detection of a flaring event of the arc by the welding system is facilitated by the secondary material changing phase in response to the flaring event, resulting in changing at least one detectable characteristic of the arc.

20 Claims, 8 Drawing Sheets

(56)　　　　　　References Cited

U.S. PATENT DOCUMENTS

| | | | |
|---|---|---|---|
| 8,338,753 B2 * | 12/2012 | Kachline | B23K 9/173 |
| | | | 219/137.44 |
| 11,969,835 B2 * | 4/2024 | Fleming | B23K 9/125 |
| 2013/0262000 A1 * | 10/2013 | Hutchison | B23K 9/09 |
| | | | 702/58 |
| 2020/0306861 A1 * | 10/2020 | Fleming | B23K 9/10 |
| 2020/0398365 A1 | 12/2020 | Bhakuni et al. | |

* cited by examiner

DETECTION OF CONTACT TIP CONSUMPTION WITH WELDING

CROSS REFERENCE TO RELATED APPLICATION/INCORPORATION BY REFERENCE

This U.S. Patent Application claims priority to and the benefit of U.S. Provisional Patent Application Ser. No. 63/316,042 filed on Mar. 3, 2022, which is incorporated by reference herein in its entirety. The disclosure of U.S. Pat. No. 7,705,269 B2, issued on Apr. 27, 2010, is incorporated by reference herein in its entirety. The disclosure of U.S. Pat. No. 8,338,753 B2, issued on Dec. 25, 2012, is incorporated by reference herein in its entirety.

FIELD

Embodiments of the present invention relate to automatic gas metal arc welding (GMAW). More specifically, embodiments of the present invention relate to improving detection of an arc flaring event due to a consumable welding wire electrode burning back to the contact tip in automatic gas metal arc welding (GMAW).

BACKGROUND

In GMAW welding (e.g., aluminum GMAW welding), if the feeding of the wire electrode is interrupted, the arc will burn back to the contact tip and welding will continue, until the weld is completed or manually shut off. This results in missed welds or incomplete welds in automatic welding operations as the machine does not recognize that the welding conditions have changed. There is also a potential for bird nesting of the wire electrode, which could destroy the wire feeder.

SUMMARY

An embodiment includes an apparatus for supporting automatic welding performed by a welding system. A welding contact tip is configured to be attached to a welding tool and is configured to accept a consumable welding wire electrode that is fed there-through during an automatic GMAW welding process to form an arc between a tip of the consumable welding wire electrode and a work piece. A secondary material (e.g., a non-copper material) is positioned near a distal end of the welding contact tip such that, during the automatic GMAW welding process, detection of a flaring event of the arc by the welding system is facilitated by the secondary material changing phase in response to the flaring event, resulting in changing at least one detectable characteristic of the arc. In some embodiments, a secondary material is attached to the outside or the inside of the contact tip. When the welding arc flares back to the contact tip, the secondary material melts and vaporizes and is introduced into the arc, which changes a voltage characteristic and/or an impedance characteristic of the arc to improve the signal to detect the flaring event.

In one embodiment, an apparatus for supporting automatic welding performed by a welding system is provided. A welding contact tip is configured to be attached to a welding tool and is configured to accept a consumable welding wire electrode that is fed there-through during an automatic GMAW welding process to form an arc between a tip of the consumable welding wire electrode and a work piece. A secondary material, being of a different material from that of the welding contact tip, is positioned at or near a distal end of the welding contact tip. During the automatic GMAW welding process, detection of a flaring event of the arc by the welding system is facilitated by the secondary material changing phase in response to the flaring event, resulting in changing at least one detectable characteristic of the arc. In at least one embodiment, the secondary material changes phase by at least one of vaporizing or ionizing into a plasma of the arc in response to the flaring event of the arc. In one embodiment, the secondary material changes phase at least by melting into a weld puddle on the work piece in response to the flaring event of the arc to form a removable slag. In one embodiment, the secondary material changes phase at least by melting into a weld puddle on the work piece in response to the flaring event of the arc and becoming an inconsequential part of a deposit on the work piece. In one embodiment, the secondary material is a non-copper material. In one embodiment, the welding contact tip is a copper material. In one embodiment, the secondary material is a silicon material. In one embodiment, the detectable characteristic of the arc is a voltage, and/or a current, and/or an impedance. In one embodiment, the secondary material is in the form of a wire and is attached to at least one of an outside or an inside of the welding contact tip. In one embodiment, the secondary material is in the form of a disk or ring. In one embodiment, the secondary material is in the form of a ground or granular material. In one embodiment, the secondary material is configured as a fuse that changes phase in response to the flaring event at least by transitioning from a shorted closed state to an un-shorted open state. In one embodiment, the secondary material is attached to the welding contact tip via at least one of an adhesive or a welded bond.

In one embodiment, a welding contact tip for supporting automatic welding performed by a welding system is provided. The welding contact tip has a proximal portion configured to be attached to a welding tool and a distal portion, being of a different material than the proximal portion. The proximal portion and the distal portion are configured to accept a consumable welding wire electrode that is fed there-through during an automatic GMAW welding process to form an arc between a tip of the consumable welding wire electrode and a work piece. During the automatic GMAW welding process, detection of a flaring event of the arc by the welding system is facilitated by the different material of the distal portion causing a change in at least one detectable characteristic of the arc in response to the flaring event. In one embodiment, the distal portion includes a non-consumable carbon-based ceramic material. In one embodiment, the proximal portion includes copper and the distal portion includes graphite. In one embodiment, the distal portion includes a consumable non-copper material.

In one embodiment, a welding contact tip for supporting automatic welding performed by a welding system is provided. The welding contact tip has a proximal portion made of a first material and is configured to be attached to a welding tool. The welding contact tip has a distal portion made of the first material and has a coating material on at least an outer surface of the distal portion which is different from that of the first material. The proximal portion and the distal portion are configured to accept a consumable welding wire electrode that is fed there-through during an automatic GMAW welding process to form an arc between a tip of the consumable welding wire electrode and a work piece. During the automatic GMAW welding process, detection of a flaring event of the arc by the welding system is facilitated by the coating material on the distal portion causing a change in at least one detectable characteristic of the arc in response to the flaring event. In one embodiment, the coating material includes a non-consumable carbon-based ceramic material. In one embodiment, the first material includes copper and the coating material includes graphite. In one embodiment, the coating material includes a consumable non-copper material.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments of the present invention may include a modified contact tip for use in automatic welding of metal materials. Embodiments of the present invention may include a welding system, having a modified contact tip, configured to detect arc flaring events.

Figure 1:
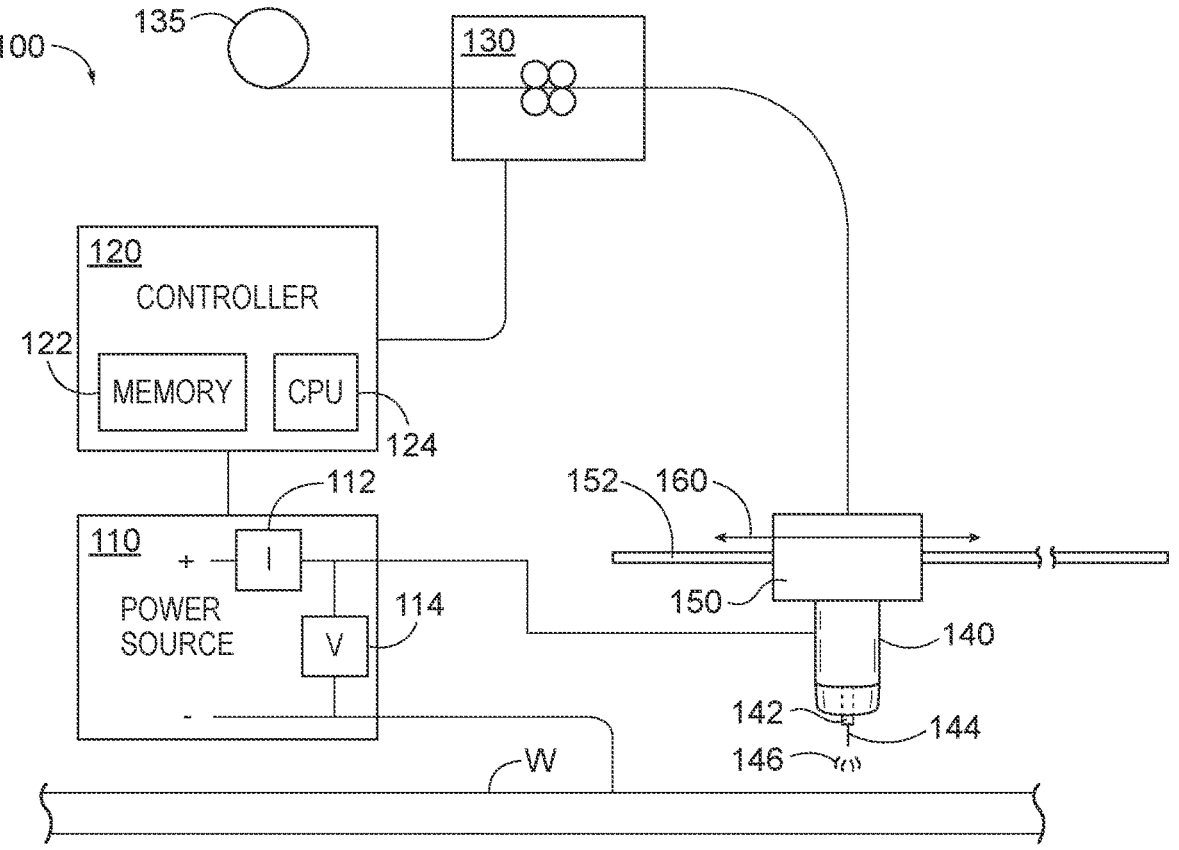
FIG. 1 is a system block diagram illustrating one embodiment of a welding system.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 is a system block diagram illustrating one embodiment of a welding system 100. The system 100 includes a welding power source 110, a controller 120, a wire feeder 130, and a welding tool 140. The welding tool 140 includes a modified contact tip 142, in accordance with an embodiment of the present invention.

The wire feeder 130 is configured to feed a consumable welding wire electrode 144 (e.g., made of aluminum) to the welding tool 140 and through the modified contact tip 142. The welding power source 110 provides the welding power (electrical welding output) to generate a welding arc 146 between a tip of the consumable welding wire electrode 144 and a work piece W. The wire feeder 130 is supplied with the consumable welding wire electrode 144 from a spool 135. In the embodiment of FIG. 1, the welding tool 140 is moved along a track 152 in a travel direction 160 by a driving mechanism 150 (e.g., to weld a seam or a joint along the work piece W) during an automatic gas metal arc welding (GMAW) process. The driving mechanism 150 may include an electric motor, in accordance with one embodiment. In accordance with other embodiments, the welding tool 140 may be moved along a seam or a joint via other means such as, for example, a welding robot having an arm that provides multiple degrees of freedom of movement of the welding tool 140.

The welding power source 110 includes a current sensor 112 and a voltage sensor 114 to respectively sense the current and the voltage of the arc formed between the tip of the electrode 144 and the work piece W. During welding, when the arc 146 is formed, the sensed current is representative of the arc current and the sensed voltage is representative of the arc voltage. In accordance with one embodiment, the current sensor 112 and/or the voltage sensor 114 are not a part of the welding power source 110 but are operatively connected thereto. The controller 120 includes a memory 122 and a processor 124 (e.g., a central processing unit or CPU) and is configured to control at least the welding power source 110 and the wire feeder 130. The controller 120 may also control the driving mechanism 150, or another controller (not shown) may control the driving mechanism 150, in accordance with various embodiments. The controller 120 may take the form of the controller 700 of FIG. 7, which is discussed later herein, in accordance with one embodiment.

As discussed subsequently herein, the controller 120, the current sensor 112, and the voltage sensor 114 are configured to operate in conjunction with the modified contact tip 142 to determine when the electrode 144 has burned back to the distal end of the modified contact tip 142 resulting in an arc flaring event. An arc flaring event occurs when the electrode 144 stops feeding toward the work piece W (e.g., due to some system failure). The electrode 144 burns back to the modified contact tip 142 and the arc 146 can begin to consume the modified contact tip 142 if the system 100 is not shut down. The sensed arc voltage and/or arc current are sent to the controller 120 (e.g., via the power source 110) and the controller determines if an arc flaring event has occurred based on the voltage and/or current.

For example, in conventional GMAW welding (e.g., aluminum GMAW welding), if the feeding of the wire electrode is interrupted, the arc can burn back to the contact tip and welding can attempt to continue, until traversal of the weld joint is completed or until the welding machine is manually shut off. This results in missed welds or incomplete welds in automatic welding operations as the welding machine does not recognize that the welding conditions have changed. There is also a potential for bird nesting of the wire electrode, which could destroy the wire feeder. However, in accordance with embodiments of the present invention, the contact tip is a modified contact tip 142 which allows for reliable detection of an arc flaring event by the controller 120 via the current sensor 112 and/or the voltage sensor 114. This allows the controller 120 to shut down the power source 110 (and, for example, the wire feeder 130) quickly enough to avoid damage to the rest of the system 100 (e.g., the welding tool 140, etc.) and prevent a continuous attempt at welding even though there is no wire coming out of the modified contact tip 142.

Figure 2:
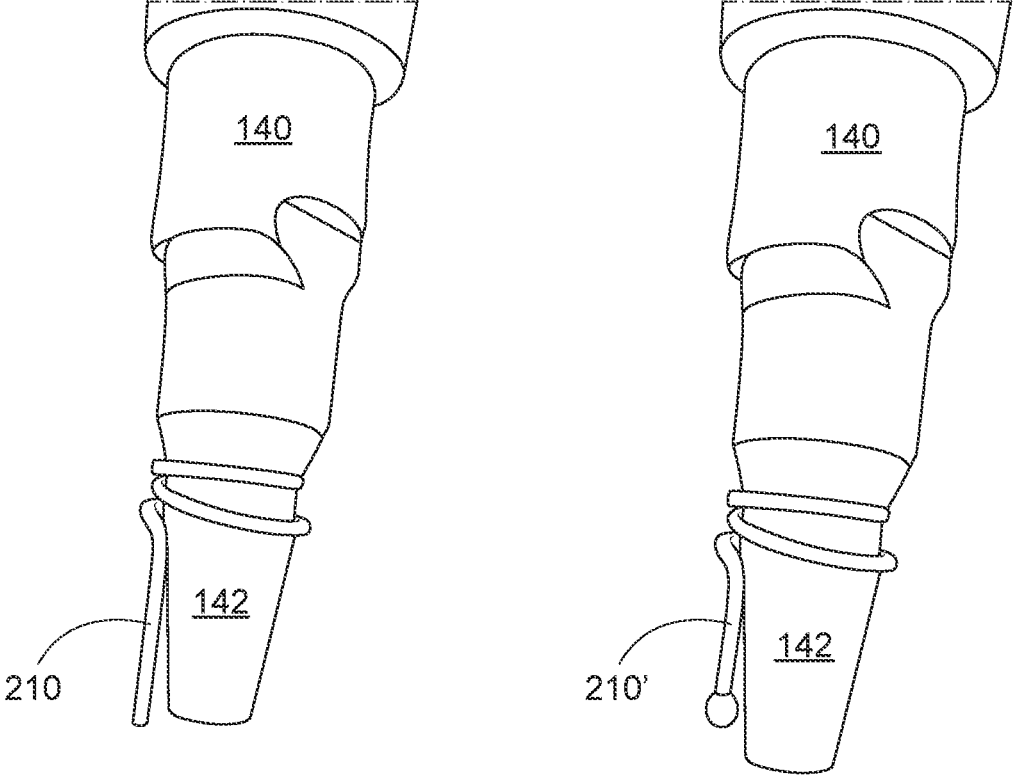
FIG. 2 illustrates one embodiment of a modified contact tip connected to a welding tool, in accordance with one embodiment.

FIG. 2 illustrates one embodiment of a modified contact tip 142 connected to a welding tool 140 (e.g., a welding torch), in accordance with one embodiment. The contact tip is a modified contact tip 142 in that it has a secondary material 210 (e.g., a non-copper material in the form of a wire) attached thereto. The term "secondary material" refers to a material (e.g., silicon) that is different from the material of the contact tip 142 (e.g., copper). The left portion of FIG. 2 shows the modified contact tip 142 with the secondary material 210 before welding. The right portion of FIG. 2 shows the modified contact tip 142 with the secondary material (designated as 210' in FIG. 2) after an arc flaring event. During the arc flaring event, at least a portion of the secondary material 210 changes phase (e.g., melts and vaporizes), resulting in changing at least one detectable characteristic of the arc (e.g., voltage, current, impedance; impedance is determined from the sensed voltage and current). For example, the vaporized secondary material is introduced into the plasma of the arc, in accordance with one embodiment, during the arc flaring event.

In one embodiment, the secondary material changes phase by at least one of vaporizing or ionizing into a plasma of the arc in response to the flaring event of the arc. In one embodiment, the secondary material changes phase by melting into a weld puddle on the work piece in response to the flaring event of the arc to form a removable slag. In one embodiment, the secondary material changes phase by melting into a weld puddle on the work piece in response to the flaring event of the arc and becoming an inconsequential part of a deposit on the work piece. In one embodiment, the secondary material is configured as a fuse that changes phase (e.g., by melting) in response to the flaring event at least by transitioning from an electrically shorted closed state to an electrically un-shorted open state.

In one embodiment, the main body of the modified contact tip 142 is made of copper and has the secondary material 210 attached thereto. The wire electrode 144 is made of an aluminum material. When an arc flaring event occurs (e.g., due to the wire electrode 144 burning back to the distal end of the copper contact tip 142), the phase change of the secondary material 210 changes the arc voltage and/or the arc current which are detected by the controller 120 via the voltage sensor 114 and/or the current sensor 112. The change in the arc voltage and/or the arc current indicates the occurrence of the flaring event to the controller 120, and the controller 120 is programmed to shut down at least the welding power source 110 as a result, in accordance with one embodiment. The difference in conductivity between copper/aluminum and the secondary material amplifies the change in the arc voltage and/or the arc current during the arc flaring event.

Figure 3:
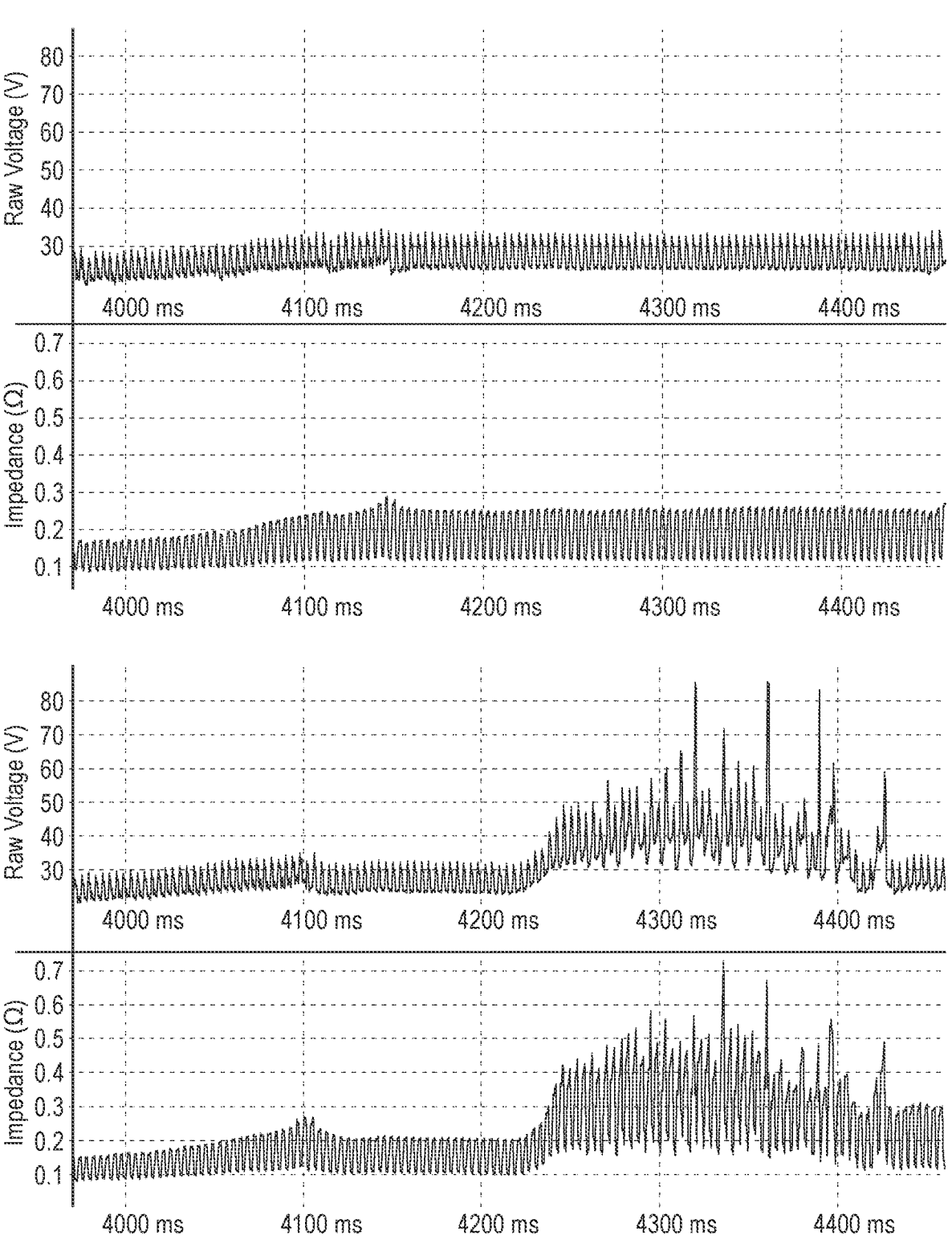
FIG. 3 illustrates graphs of how arc characteristics change to improve detection of an arc flaring event when using a modified contact tip, in accordance with one embodiment.

FIG. 3 illustrates graphs of how arc characteristics change to improve detection of an arc flaring event when using a modified contact tip, in accordance with one embodiment. The graphs of voltage and impedance in the top portion of FIG. 3 show how detected voltage and impedance change with a conventional copper contact tip (with no non-copper secondary material attached) when an arc flaring event occurs. The graphs of voltage and impedance in the bottom portion of FIG. 3 show how detected voltage and impedance change with the modified contact tip of FIG. 2 when an arc flaring event occurs. The change in voltage and impedance is much more pronounced (and, therefore, more reliably detectable) in the bottom portion of FIG. 3. Therefore, the welding power supply 110 will be more reliably shut down by the controller 120 when an arc flaring event occurs using the modified contact tip 142 of FIG. 2 during an automatic GMAW welding process.

In accordance with various embodiments, the modified contact tip 142 may take different forms. The wire form of the secondary material 210 attached to the outside of the contact tip 142 has already been discussed with respect to FIG. 2. In an alternative embodiment, the wire form of the secondary material may be attached inside the contact tip 142. In yet another embodiment, the secondary material can be configured as a fuse that "opens" and changes the detectable characteristic when the arc flaring event occurs. Other embodiments of a modified contact tip are possible as well.

Figure 4:
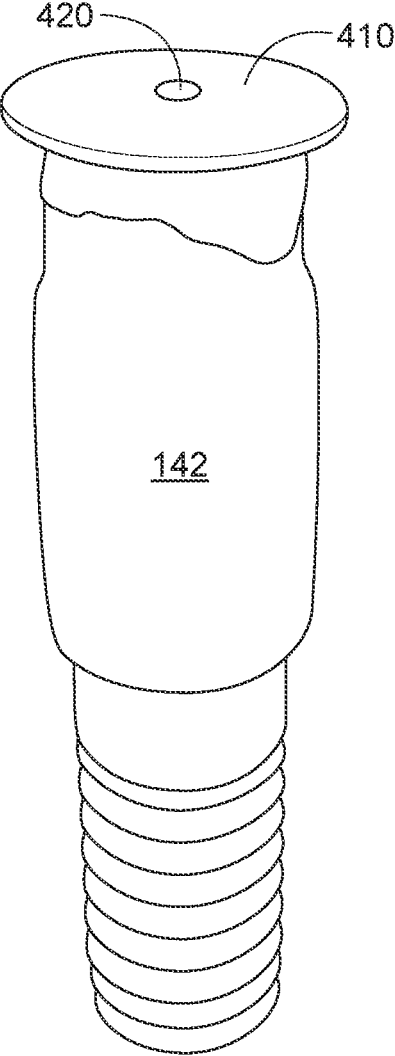
FIG. 4 illustrates one embodiment of a modified contact tip having a disk-shaped secondary material attached thereto at a distal end, and having a central passage for a wire electrode to pass.
Figure 5:
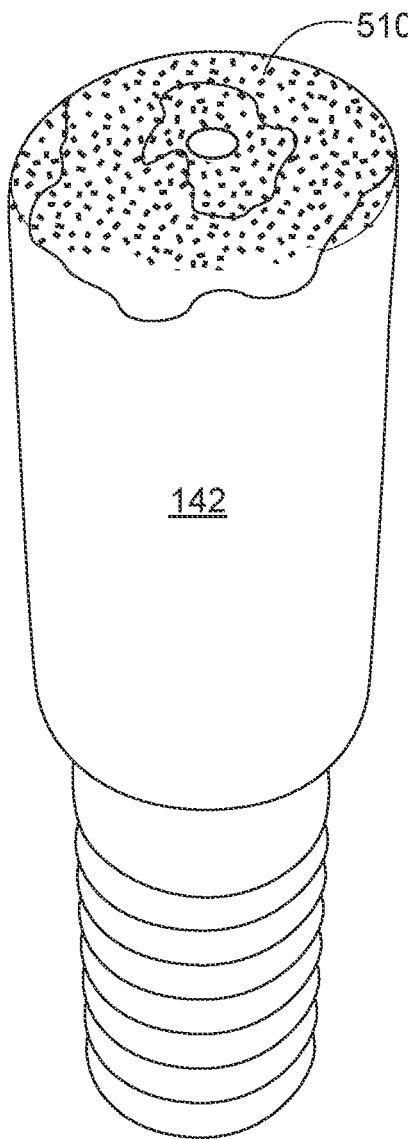
FIG. 5 illustrates another embodiment of a modified contact tip having a ground secondary material attached thereto at a distal end.
Figure 6:
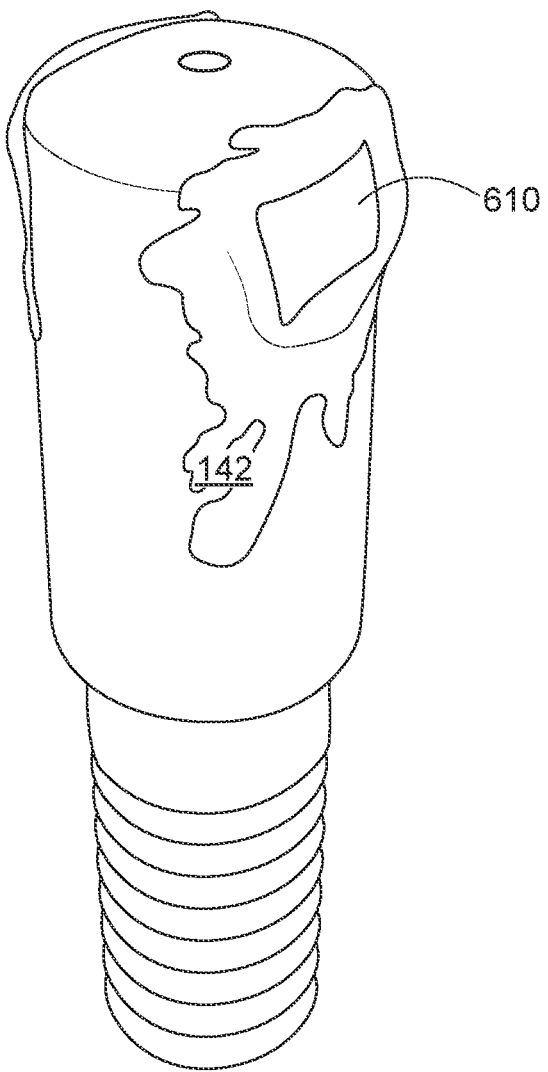
FIG. 6 illustrates yet another embodiment of a modified contact tip having a side secondary material attached thereto near a distal end.

For example, FIG. 4 illustrates one embodiment of a modified contact tip 142 having a disk (or ring) secondary material 410 attached thereto at a distal end, and having a central passage 420 for the wire electrode 144 to pass. The disk secondary material 410 may be, for example, made of a silicon material or some other non-copper material. FIG. 5 illustrates another embodiment of a modified contact tip 142 having a ground (particulate or granular) secondary material 510 attached thereto at a distal end. The ground secondary material 510 may be, for example, made of a ground silicon material or some other ground non-copper material. FIG. 6 illustrates yet another embodiment of a modified contact tip 142 having a side-mounted secondary material 610 attached thereto near a distal end. The side-mounted secondary material 610 may be, for example, made of a silicon material or some other non-copper material. The secondary materials 410, 510, and 610 may be attached at or near the distal end of the contact tip 142 via an adhesive, for example, or via some other form of bonding such as, for example, welding. Other methods of attaching the secondary material may be possible as well, in accordance with other embodiments (e.g., press-fitting).

Again, a detectable characteristic of the arc can be changed by changing the plasma of the arc. For example, in some embodiments, the secondary material can vaporize or ionize into the plasma of the arc, but not melt into the weld puddle. Alternatively, in other embodiments, the secondary material melts into the weld puddle, forming some kind of a slag on the work piece that can be readily removed. As a further alternative, in yet other embodiments, the secondary material melts into the weld puddle and becomes a permanent part of the work piece, but is inconsequential to the resultant deposit on the work piece. As used herein, the term "inconsequential" refers to the secondary material not affecting the resultant deposit in any practical negative manner with respect to the purpose of the weld.

In other embodiments, the disk secondary material 410, the ground secondary material 510, or the side-mounted secondary material 610 (or the distal end of the contact tip 142 itself) can be made out of a carbon-based ceramic material (maybe graphite), or something similar, that does not get consumed but still changes a detectable characteristic of the arc to provide a good signal for detection of an arc flaring event. In yet another embodiment, the secondary material can be a coating material on the distal end of the contact tip 142. In one embodiment, the coating material includes a non-consumable carbon-based ceramic material. In one embodiment, the first material includes copper and the coating material includes graphite. In one embodiment, the coating material includes a consumable non-copper material.

Figure 7:
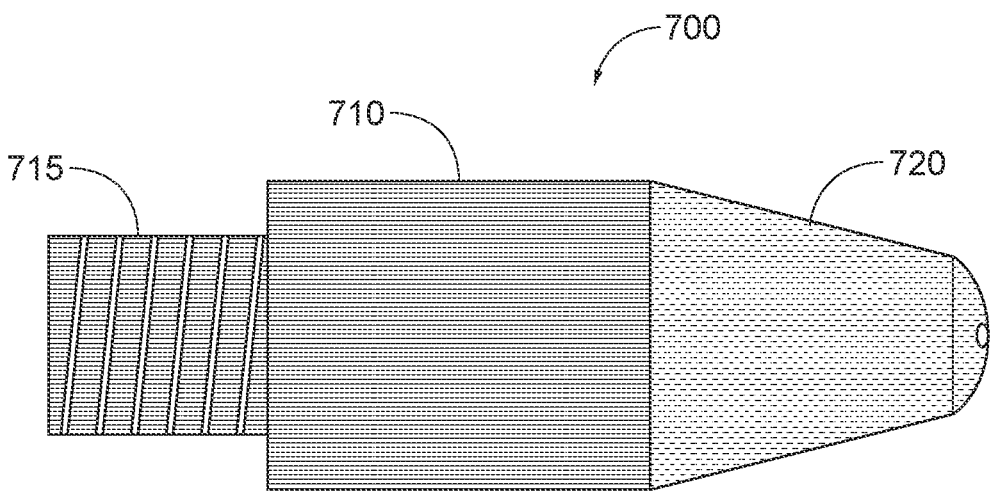
FIG. 7 illustrates one embodiment of a contact tip having a proximal portion and a distal portion.

For example, FIG. 7 illustrates one embodiment of a contact tip 700 having a proximal portion 710 and a distal portion 720. The proximal portion 710 includes a threaded portion 715 that allows the contact tip 700 to be attached to (e.g., screwed into) a welding tool (e.g., the welding tool 140 of FIG. 1). In one embodiment, the proximal portion 710 is made of copper and the distal portion 720 is made of a secondary non-copper material such as, for example, silicon or a carbon-based ceramic material (e.g., graphite). In another embodiment, the proximal portion 710 and the distal portion 720 are made of copper. However, an outer surface of the distal portion 720 is coated (e.g., via physical vapor deposition) with a secondary material that is not copper.

Figure 8:
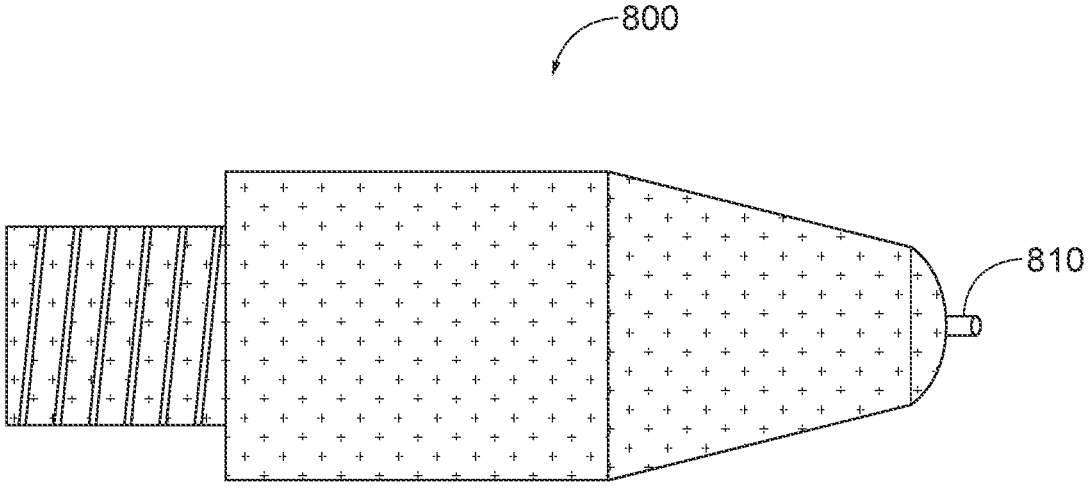
FIG. 8 illustrates one embodiment of a contact tip having a secondary material screwed into or pressed-fitted into a distal end of the contact tip.

FIG. 8 illustrates one embodiment of a contact tip 800 having a secondary material element 810 screwed into or press-fitted into a distal end hole of the contact tip 800. In one embodiment, all but the secondary material element 810 of the contact tip is made of copper (the secondary material element 810 is made of a non-copper material). The secondary material element 810 allows a fed consumable welding wire electrode to pass there-through (e.g., the secondary material element 810 is in the form of a small threaded tube). The secondary material element 810 gets consumed during an arc flaring event, changing a detectable characteristic of the arc as discussed previously herein, in accordance with one embodiment. In another embodiment, the secondary material element 810 may be made of a material that does not get consumed (e.g., the secondary material element is a carbon-based ceramic material) but, nonetheless, results in a change of a detectable characteristic of the arc during an arc flaring event. In yet another embodiment, instead of being screwed or press-fitted, the secondary material is impregnated into the copper of the contact tip at the distal end and is released upon melting during an arc flaring event.

In one embodiment, the contact tip itself could be made out of something other than copper, not needing an attachable secondary material. The ionization potential of copper and aluminum are very similar. With a non-copper contact tip (e.g., tungsten, steel, stainless steel, etc.) and an aluminum wire electrode, the arc characteristic would change once the arc flared back to the distal end of the contact tip, allowing for reliable detection of the arc flaring event. Furthermore, a non-copper contact tip may provide other unexpected benefits (e.g., pre-heating of aluminum wire, better control of hydrogen).

In some embodiments, a secondary material (element) at the distal end of the contact tip acts as a higher resistive material that provides a path for current to flow once a lower resistive copper contact path (fuse) is melted. The secondary material effectively provides a parallel path for the current to flow, but only becomes activated when the lesser resistant path is no longer available. The extreme condition is for the secondary material to be an electrical insulator, preventing a circuit to be completed and causing a signal large enough to be detected such that welding can be stopped.

Figure 9:
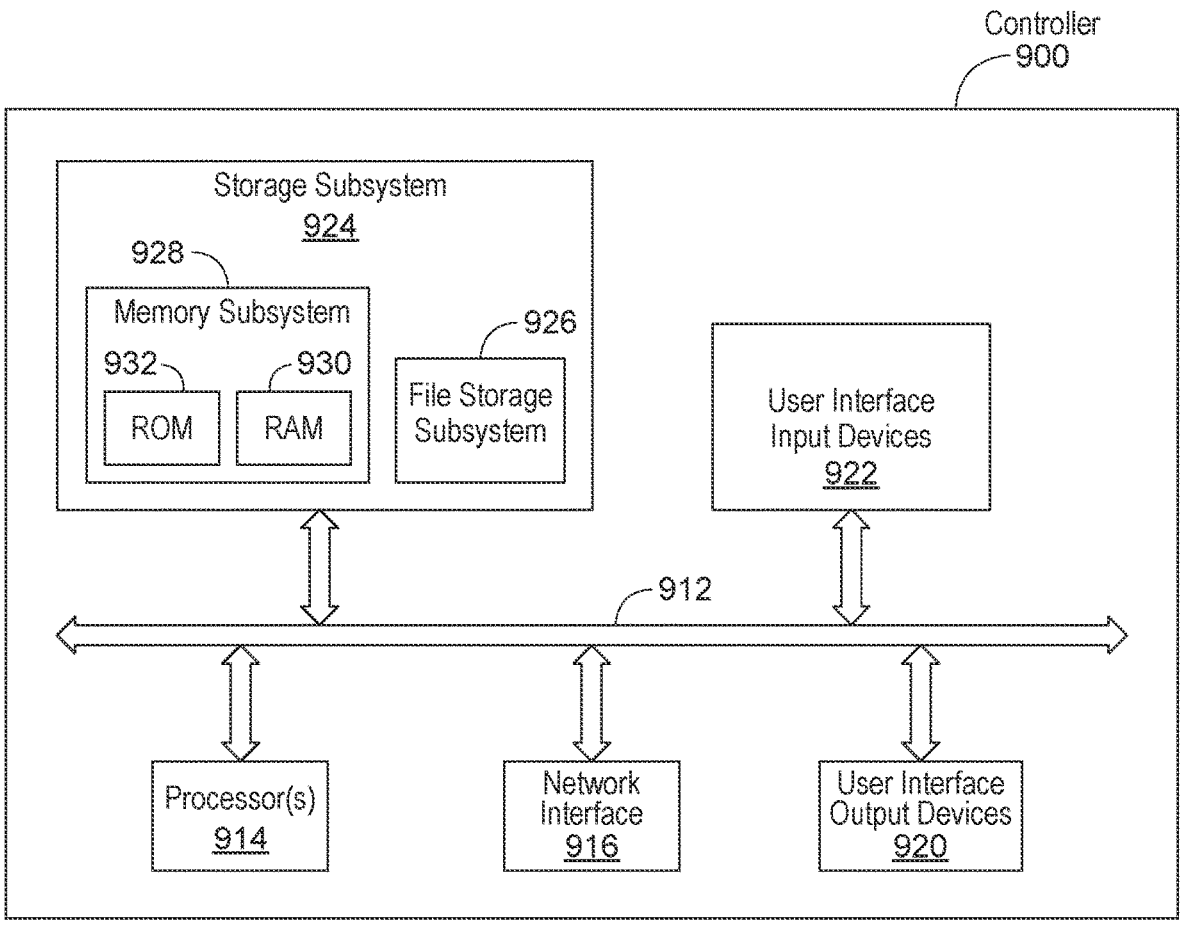
FIG. 9 illustrates a block diagram of an example embodiment of a controller that can be used, for example, in the welding system of FIG. 1.

FIG. 9 illustrates a block diagram of an example embodiment of a controller 900 that can be used, for example, in the welding system 100 of FIG. 1. For example, the controller 900 is located within the welding system 100 (e.g., as the controller 120), in accordance with one embodiment, as shown in FIG. 1. Referring to FIG. 9, the controller 900 includes at least one processor 914 (e.g., a microprocessor, a central processing unit, a graphics processing unit) which communicates with a number of peripheral devices via bus subsystem 912. These peripheral devices may include a storage subsystem 924, including, for example, a memory subsystem 928 and a file storage subsystem 926, user interface input devices 922, user interface output devices 920, and a network interface subsystem 916. The input and output devices allow user interaction with the controller 900. Network interface subsystem 916 provides an interface to outside networks and is coupled to corresponding interface devices in other devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 900 or onto a communication network.

User interface output devices 920 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 900 to the user or to another machine or computer system.

Storage subsystem 924 stores programming and data constructs that provide some or all of the functionality described herein. For example, computer-executable instructions and data are generally executed by processor 914 alone or in combination with other processors. Memory 928 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 926 in the storage subsystem 924, or in other machines accessible by the processor(s) 914.

Bus subsystem 912 provides a mechanism for letting the various components and subsystems of the controller 900 communicate with each other as intended. Although bus subsystem 912 is shown schematically as a single bus, alternative embodiments of the bus subsystem may use multiple buses.

The controller 900 can be of varying types. Due to the ever-changing nature of computing devices and networks, the description of the controller 900 depicted in FIG. 9 is intended only as a specific example for purposes of illustrating some embodiments. Many other configurations of a controller are possible, having more or fewer components than the controller 900 depicted in FIG. 9.

While the disclosed embodiments have been illustrated and described in considerable detail, it is not the intention to restrict or in any way limit the scope of any subsequent appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of subsequent appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by subsequent appended claims, and equivalents thereof.

What is claimed is:

1. An apparatus for supporting automatic welding performed by a welding system, the apparatus comprising:
a welding contact tip configured to be attached to a welding tool and configured to accept a consumable welding wire electrode that is fed there-through during an automatic GMAW welding process to form an arc between a tip of the consumable welding wire electrode and a work piece; and
a secondary material, being of a different material from that of the welding contact tip, positioned at or near a distal end of the welding contact tip such that, during the automatic GMAW welding process, detection of a flaring event of the arc by the welding system is facilitated by the secondary material changing phase in response to the flaring event, resulting in changing at least one detectable characteristic of the arc.

2. The apparatus of claim 1, wherein the secondary material is a non-copper material.

3. The apparatus of claim 1, wherein the welding contact tip includes a copper material.

4. The apparatus of claim 1, wherein the secondary material includes a silicon material.

5. The apparatus of claim 1, wherein the at least one detectable characteristic of the arc includes a voltage, a current, or an impedance.

6. The apparatus of claim 1, wherein the secondary material is in the form of a wire and is attached to at least one of an outside or an inside of the welding contact tip.

7. The apparatus of claim 1, wherein the secondary material is in the form of a disk.

8. The apparatus of claim 1, wherein the secondary material is in the form of a ground material.

9. The apparatus of claim 1, wherein the secondary material is configured as a fuse that changes phase in response to the flaring event at least by transitioning from a shorted closed state to an un-shorted open state.

10. The apparatus of claim 1, wherein the secondary material is attached to the welding contact tip via at least one of an adhesive or a welded bond.

11. The apparatus of claim 1, wherein the secondary material changes phase by at least one of vaporizing or ionizing into a plasma of the arc in response to the flaring event of the arc.

12. The apparatus of claim 1, wherein the secondary material changes phase at least by melting into a weld puddle on the work piece in response to the flaring event of the arc to form a removable slag.

13. The apparatus of claim 1, wherein the secondary material changes phase at least by melting into a weld puddle on the work piece in response to the flaring event of the arc and becoming an inconsequential part of a deposit on the work piece.

14. A welding contact tip for supporting automatic welding performed by a welding system, the welding contact tip comprising:
a proximal portion configured to be attached to a welding tool; and
a distal portion, being of a different material than the proximal portion,
wherein the proximal portion and the distal portion are configured to accept a consumable welding wire electrode that is fed there-through during an automatic GMAW welding process to form an arc between a tip of the consumable welding wire electrode and a work piece, and
wherein, during the automatic GMAW welding process, detection of a flaring event of the arc by the welding system is facilitated by the different material of the distal portion causing a change in at least one detectable characteristic of the arc in response to the flaring event.

15. The welding contact tip of claim 14, wherein the distal portion includes a non-consumable carbon-based ceramic material.

16. The welding contact tip of claim 14, wherein the proximal portion includes copper and the distal portion includes graphite.

17. The welding contact tip of claim 14, wherein the distal portion includes a consumable non-copper material.

18. A welding contact tip for supporting automatic welding performed by a welding system, the welding contact tip comprising:
a proximal portion made of a first material and configured to be attached to a welding tool; and
a distal portion made of the first material and having a coating material on at least an outer surface of the distal portion which is different from that of the first material,
wherein the proximal portion and the distal portion are configured to accept a consumable welding wire electrode that is fed there-through during an automatic GMAW welding process to form an arc between a tip of the consumable welding wire electrode and a work piece, and
wherein, during the automatic GMAW welding process, detection of a flaring event of the arc by the welding system is facilitated by the coating material on the distal portion causing a change in at least one detectable characteristic of the arc in response to the flaring event.

19. The welding contact tip of claim 18, wherein the coating material includes a non-consumable carbon-based ceramic material.

20. The welding contact tip of claim 18, wherein the coating material includes a consumable non-copper material.

* * * * *